Jan. 28, 1964   D. E. KING ETAL   3,119,524
AUTOMATIC CONTROLLED VOLUME LIQUID DELIVERY ASSEMBLY
Filed June 2, 1961   2 Sheets-Sheet 1

INVENTORS
DUNCAN E. KING
JOSEPH A. McNEILLY
BY
*Arthur H. Seidel*
ATTORNEY

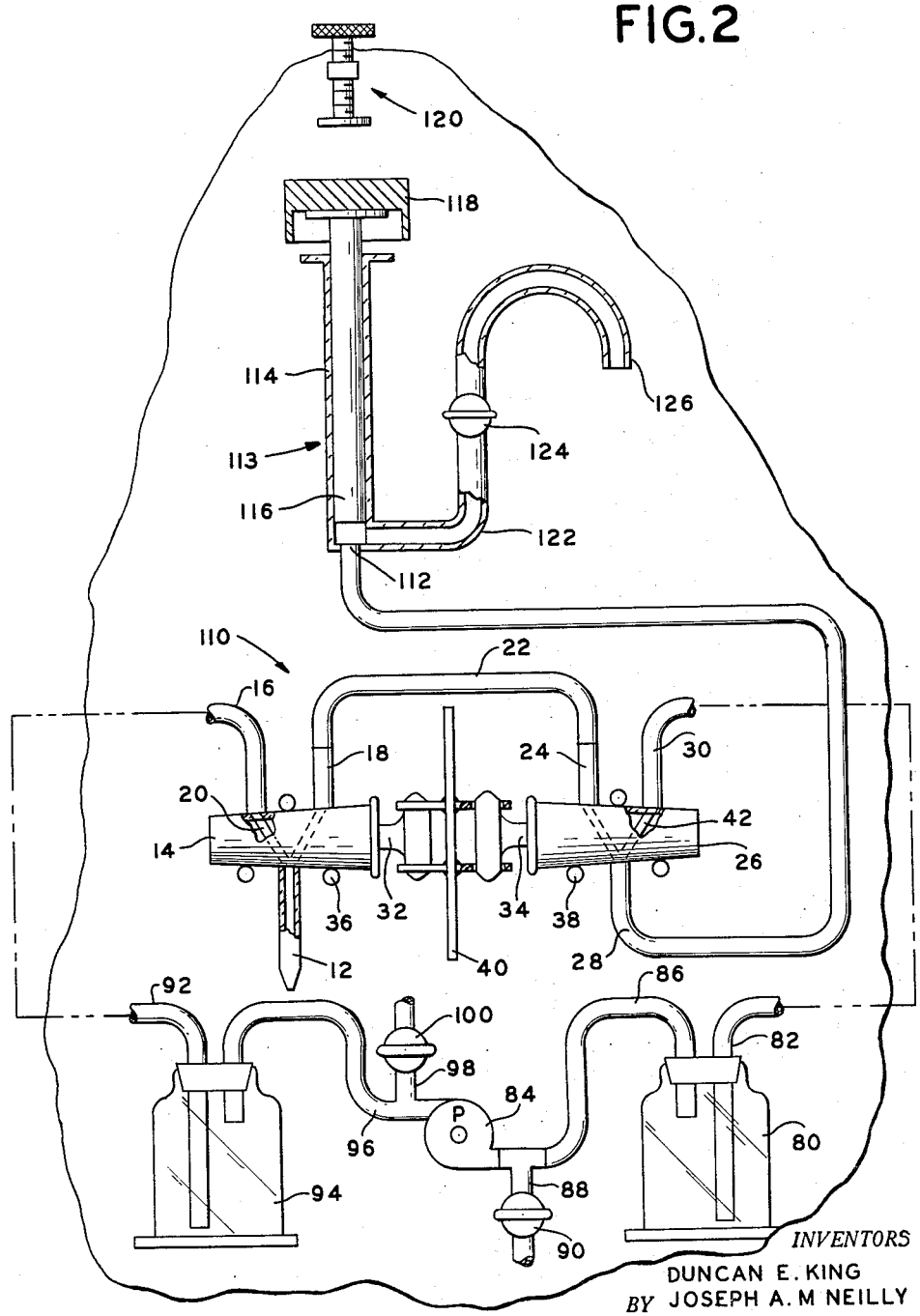

United States Patent Office 3,119,524
Patented Jan. 28, 1964

1

3,119,524
AUTOMATIC CONTROLLED VOLUME LIQUID
DELIVERY ASSEMBLY
Duncan E. King, Wayne, and Joseph A. McNeilly, Plymouth Meeting, Pa., assignors to Arthur H. Thomas Company, Philadelphia, Pa., a corporation of Pennsylvania
Filed June 2, 1961, Ser. No. 114,487
9 Claims. (Cl. 222—47)

This invention relates to an automatic controlled volume liquid delivery assembly, and more particularly to an assembly which enables rapid repetitive closely controlled liquid volumes to be delivered.

There are many laboratory situations in which it is most desirable to be able to automatically deliver closely controlled volumes of liquid both rapidly and repetitively. For example, see the so-called automatic Seligson pipet, which was devised by Dr. David Seligson of the Graduate Hospital of the University of Pennsylvania (see American Journal of Clinical Pathology, volume 28, No. 2 (Aug. 1957), pp. 200–207; and Technical Bulletin of the Registry of Medical Technologists, vol. 27, No. 7 (July 1957), pp. 152–159). A known volume of diluting fluid must be delivered in order to control the final concentration of the sample being examined in the dilution. For this purpose, a laboratory burette is commonly used to deliver the diluent. The volume delivered is controlled by allowing the liquid level in the burette to fall to a selected reference mark by visual observation and manual interruption of diluent flow by means of a stopcock. The burette cannot be allowed to drain completely since the volumetric calibration of the burette is usually restricted to the upper barrel, and the nature of the Seligson pipet requires that its tip remain filled with diluent to prevent drying of the bore and contamination.

While attempts have been made to overcome the need for visually noting the volume of diluent that is delivered, as by attaching a dispensing vessel of known volume to the Seligson pipet, these prior attempts have violated the condition that the pipet tip shall remain filled when a desired volume of the diluent is delivered.

Furthermore, in connection with the Seligson pipet, attempts have been made to eliminate the separate clamp or cock on the diluent refill tube by devising special forms of the Seligson pipet, using a multiple bore, such as three or four bores through the stopcock plug. However, such special multiple bore stopcocks are expensive, difficult to make, and must be provided for each sample size which is desired.

This invention has as an object the provision of a novel automatic controlled volume liquid delivery assembly.

This invention has as another object the provision of an automatic controlled volume liquid delivery assembly in which a known volume of displaced diluent may be delivered to a sample without draining the diluent delivery vessel, and in particular in which a Seligson pipet may be utilized with its tip filled with diluent between sampling operations.

This invention has as still another object the provision of an automatic controlled volume liquid delivery assembly which permits both rapid and repetitive delivery of closely controlled liquid volumes.

2

This invention has as a further object the provision of an automatic controlled volume liquid delivery assembly which may be used with a plurality of sizes of Seligson pipets without the need for multiple bore stopcocks.

Other objects will appear hereinafter.

For the purpose of illustrating the invention there is shown in the drawings a form which is presently preferred; it being understood, however, that this invention is not limited to the precise arrangements and instrumentalities shown.

FIGURE 2 is a diagrammatic illustration of another embodiment of the present invention.

Figure 1:
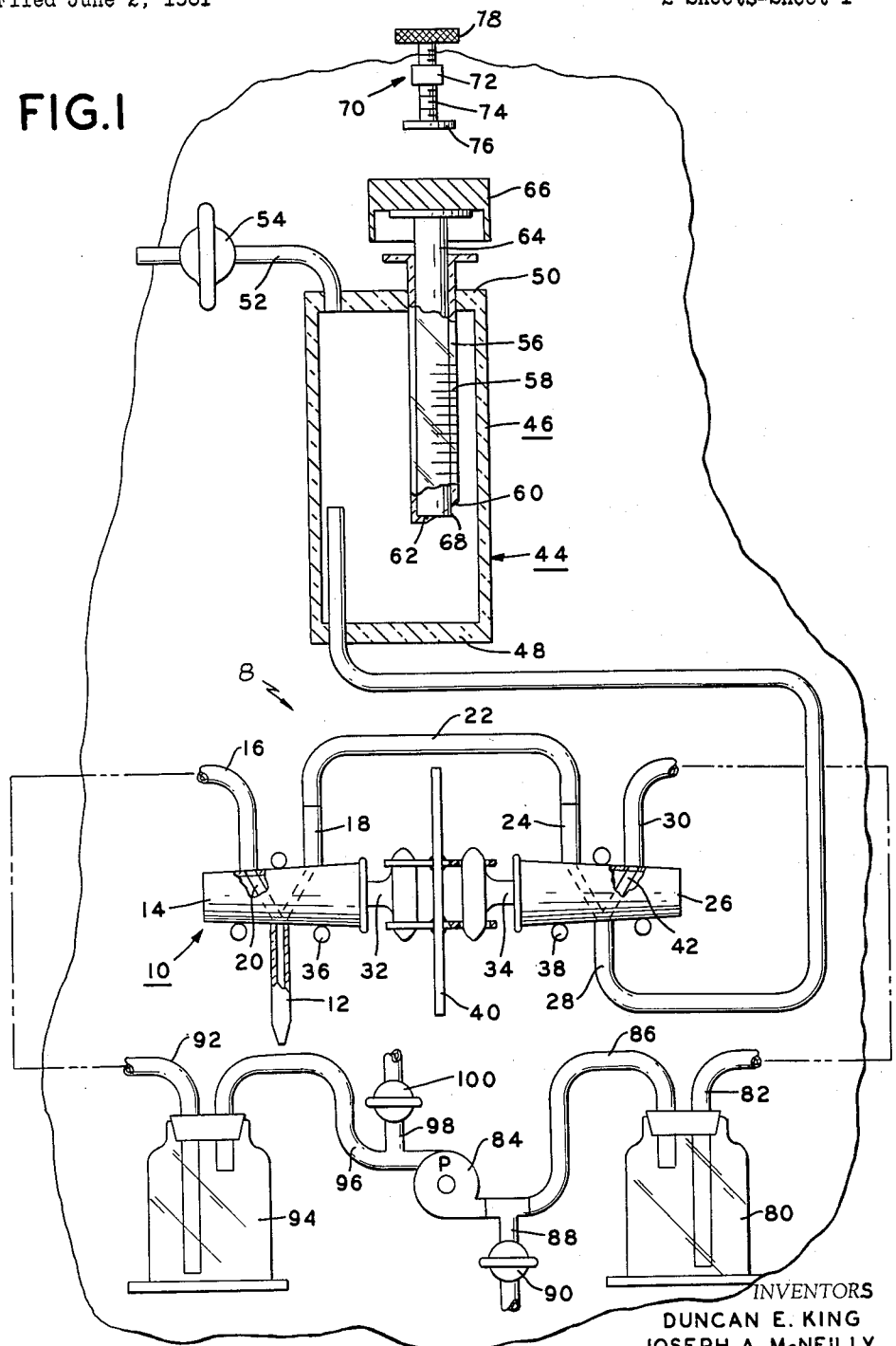
FIGURE 1 is a diagrammatic illustration of the present invention.

Referring to FIGURE 1 of the drawing, wherein the automatic controlled volume liquid delivery assembly 8 is shown diagrammatically, the Seligson pipet is designated generally as 10. The Seligson pipet 10 includes the calibrated tip 12 which depends from the stopcock 14. The stopcock 14 enables the calibrated tip 12 to be joined in communication with either the suction take-off 16 or the delivery connection 18. Thus, the stopcock 14 is provided with a bore 20 which may be coupled to either the suction take-off 16 and the calibrated tip 12 or to the delivery connection 18 and the calibrated tip 12.

As is common with Seligson pipets, the calibrated tip 12 delivers a closely calibrated volume of liquid.

The Seligson pipet is joined to the assembly by the coupler conduit 22. Thus, the coupler conduit 22 connects the delivery connection 18 of the Seligson pipet 10 to the delivery arm 24 of the stopcock 26 of the assembly. The stopcock 26 is similar to the stopcock 14 and may be used to couple the delivery arm 24 with the diluent refill line 28 or alternatively to couple the diluent reservoir arm 30 with the diluent refill line 28.

The plugs 32 and 34 of the respective stopcocks 14 and 26 are coupled together, with the stopcocks 14 and 26 being fixedly mounted in aligned relationship by their respective clamps 36 and 38. The coupling of the plugs 32 and 34 is effected by means of the handle 40 so that the plugs 32 and 34 are always moved in unison when the handle 40 is rotated. The relationship of the bore 20 of the stopcock 14 to the bore 42 of the stopcock 26 is such that when the bore 20 is coupled to the suction take-off 16 and the calibrated tip 12, the bore 42 is coupled to the diluent reservoir arm 30 and the diluent refill line 28. When the bore 20 of the stopcock 14 is coupled to the delivery connection 18 and the calibrated tip 12 the bore bore 42 of the stopcock 26 is coupled to the delivery arm 24 and the diluent refill line 28.

The diluent refill line 28 joins the stopcock 26 to the diluent delivery vessel 44.

The diluent delivery vessel 44 includes the reservoir chamber 46. The floor 48 of the reservoir chamber 46 is provided with an opening through which the diluent refill line 28 extends into the reservoir chamber 46 for a height appreciably above the floor 48. The ceiling 50 of the reservoir chamber 46 is provided with a vent 52 having the stopcock 54. The ceiling 50 of the reservoir chamber 46 is also provided with an opening through which the precision bore cylinder 56 extends. The wall of the precision bore cylinder 56 is graduated with graduation marks 58 to indicate volume increments.

The bottom portion of the precision bore cylinder 56 is cut at a bias at 60. However, the bias cut 60 does not include the entire floor of the precision bore cylinder 56. Thus, the precision bore cylinder 56 has a floor 62 which extends radially inwardly.

As will be more fully explained below, the floor 62 of the precision bore cylinder 56 serves as a stop shoulder for the precision ground piston 64 which is received with the precision bore cylinder 56. Furthermore, as will be explained more fully below, the bias cut 60 at the base of the precision bore cylinder 56 avoids the entrapment of air intermediate the precision ground piston 64 and the precision bore cylinder 56.

The precision ground piston 64 is provided with a weighted cap 66 which burdens the precision ground piston 64 downwardly. At the lowermost limit of the downward excursion of the precision ground piston 64 the lowermost end 68 of the precision ground piston 64 projects through the bias cut 60 of the precision bore cylinder 56.

The adjustable stop designated generally as 70 limits the upward excursion of the precision ground piston 64. The adjustable stop 70 may comprise the nut 72 in which is threadably received the screw member 74 having the stop element 76. The relative height of the stop element 76 above the weighted cap 66 of the precision ground piston 64 may be selectively adjusted by the rotation of the screw member 74 in the nut 72. This may be accomplished most readily by the manipulation of the knurled head 78 of the screw member 74.

The diluent reservoir arm 30 is joined to the diluent reservoir 80. This can be accomplished by a disconnectable coupler shown in dot-dash line, such coupler joining the diluent reservoir arm 30 to the arm 82 of the diluent reservoir 80. The diluent reservoir 80 is connected to the air pump 84 by the arm 86. A pressure control vent 88 provided with a stopcock 90 is carried in the arm 86 intermediate the diluent reservoir 80 and the air pump 84.

The diluent reservoir 80 may be of any capacity and is preferably of substantially larger capacity than the reservoir chamber 46.

The suction take-off 16 of the Seligson pipet 10 is coupled to the vacuum port of the air pump 84 through the arm 92 of the vacuum trap 94 and thence through the arm 96 of the vacuum trap 94. A suction control vent 98 having a stopcock 100 may be provided in the arm 96.

Another embodiment of the present invention is illustrated in FIGURE 2 and designated generally as 110. The apparatus 110 is identical with the apparatus 8 except as set forth hereinafter.

The diluent refill line of the apparatus 110 is connected to the port 112 in the bottom wall of a diluent reservoir 113 which includes a syringe cylinder 114 having calibrations thereon. A piston 116 is reciprocally disposed within and guided by the cylinder 114. The piston 116 is provided with a weighted cap 118 which is identical with cap 66. An adjustable stop 120 which is identical with stop 70, is provided for the piston 116.

The cylinder 114 is provided with an outlet conduit 122 extending therefrom adjacent the bottom thereof. A stopcock 124 is provided in conduit 122. One end of a U-shaped conduit 126 is connected to the outlet port on the stopcock 124.

The operation of the apparatus 8 of the present invention is as follows:

The handle 40 is turned to orient stopcocks 14 and 26 so that the calibrated tip 12 is connected to suction take-off 16 and diluent reservoir arm 30 is connected to diluent refill line 28. Tip 12 is now ready to take in a sample by suction, and pressure is applied by the other side of pump 84 through conduit 86 to force diluent in diluent reservoir 80 through conduits 82, 30, and 28 into the diluent delivery vessel 44 causing the piston 64 to rise until the weighted cap 66 strikes the adjustable stop 76. Any air bubbles in the line pass to the top of reservoir 44 and are vented through stopcock 54.

Then, the Seligson pipet 10 is operated in the normal manner. Thus, the calibrated tip 12 is filled by being immersed within the sample with suction being drawn through the suction take-off 16 which is coupled to the calibrated tip 12 by the bore 20 of the stopcock 14. Excess sample drawn through the calibrated tip 12 is delivered to the vacuum trap 94 through the suction take-off 16 and the arm 92. In this manner, the calibrated tip 12 is cleaned with the sample and is filled with the sample.

After the calibrated tip 12 has been cleaned with the sample and filled with the sample, as aforesaid, the handle 40 is rotated so that the calibrated tip 12 is coupled to the delivery connection 18 by the bore 20 of the stopcock 14 and the delivery arm 24 (which is coupled to the delivery connection 18 by the coupler conduit 22) is connected to the diluent refill line 28 by the bore 42 of the stopcock 26.

A controlled volume of liquid is delivered from the diluent delivery vessel 44 through the diluent refill line 28, delivery arm 24, coupler conduit 22 and delivery connection 18. The precision ground piston 64 whose excursion limits are determined by the floor 62 of the precision bore cylinder 56 and the stop element 76 of the adjustable stop 70 descends by the action of gravity. The descent of the precision ground piston 64 delivers a controlled volume of diluent liquid from the reservoir chamber 46. The amount of such controlled liquid volume may be gauged by the graduation marks 58 on the wall of the precision bore cylinder 56. The weight of cap 66 effects the descent of the precision ground piston 64 at the predetermined desired rate.

All that is required to sample and deliver another controlled volume of liquid is to repeat the operation of turning stopcock handle 40.

The bias cut 60 at the bottom of the precision bore cylinder 56 effects the avoidance of air entrapment below the precision ground piston 64.

In the operation of the Seligson pipet 10, the calibrated tip 12 is kept filled with diluent from the diluent delivery vessel 44 after each delivery of diluent in order to prevent drying of the bore of the calibrated tip 12 and contamination thereof.

The diluent within the bore of the calibrated tip 12 is sucked into the vacuum trap 94 prior to each sampling, and the calibrated tip 12 is cleaned with sample as heretofore indicated prior to each determination.

The stopcock 100 serves to regulate the suction imposed on the tip 12, and governs the speed with which a sample is drawn.

The filling of the diluent delivery vessel 44 may be accomplished while the Seligson pipet 10 is being used to effect a determination. Thus, when the bore 20 of the stopcock 14 couples the suction take-off 16 to the calibrated tip 12, the bore 42 of the stopcock 26 couples the diluent reservoir 30 to the diluent refill line 28. The pressure side of the pump 84 then urges diluent liquid from the diluent reservoir 80 through the arm 82, diluent reservoir arm 30 and diluent refill line 28 into the diluent delivery vessel 44. Air within the diluent delivery vessel 44 may be vented as heretofore explained through the vent 52 and stopcock 54.

The positive action of the pump 84 on the diluent reservoir 80 may be regulated by opening the stopcock 90 in the pressure control vent 88. This regulates the speed at which diluent delivery vessel is filled.

Since the coupler conduit 22 and the conduit shown in dash-dot line which join the suction take-off 16 to the arm 92 and the diluent reservoir arm 30 to the arm 82 may be formed from flexible tubing, such as Tygon, rubber, or other suitable elastomeric material, facile substitution of one size Seligson pipet for another may be readily accomplished and facile replacement or discharge of the contents of the diluent reservoir 80 and vacuum trap 94 may likewise be accomplished. It is, of course, to be understood that the drawing is diagrammatic and that in practice the diluent reservoir 80 and the vacuum trap 94 will both be of considerably larger volume than the diluent delivery vessel 44.

The use of the automatic controlled volume liquid delivery assembly of the present invention enables rapid and repetitive determinations to be made with the Seligson pipet using unskilled operators, since the operation of the assembly, unlike the operation of the burette, requires no skill or technique whatsoever. Furthermore, the rate of determinations may be greatly accelerated since as above-noted vessels of very large capacity may be utilized for the diluent reservoir and for the vacuum trap, and the diluent delivery vessel may be refilled simultaneously with a determination without in any way interfering with the conduct of the determination.

The volume of liquid delivery is closely controlled since the stop element 76 may be accurately positioned at any predetermined distance from the top surface of the weighted cap 66 of the precision ground piston 64.

The operation of the apparatus 110 is identical with the apparatus 8 except that the air bubbles, if present, are now vented through conduits 122 and 126. The apparatus 110 has an advantage over the apparatus 8 in that the diluent reservoir 113 is simpler and cheaper than the diluent reservoir 44.

In its broadest aspect, the present invention may include a diluent reservoir having a reciprocating piston therein. The piston need not have a precision ground guide cylinder so long as the reservoir is a sealed unit. So long as there is a sealed unit, the piston may cause a discharge of the liquid since two bodies cannot occupy the same space at the same time.

If desired, the handle 40 may be connected to a reversible motor with appropriate limit switches being provided to stop the motor upon a predetermined rotative movement of the handle 40. Thus, the stopcocks 14 and 26 may be operated from a remote point. Also, a positive drive means such as an air cylinder or a motor may be provided to operate the pistons 64 and 116.

While the assembly of the present invention has been described in conjunction with a Seligson pipet, it should be understood that the assembly of the present invention may be utilized in any system where it is desired to automatically deliver a closely controlled volume of liquid, and in particular where rapid and repetitive delivery of closely controlled liquid volumes is desired.

For laboratory usage, the apparatus of the present invention is preferably made of glass, except for the disconnectable conduits which may be made from elastomeric material. However, where the assembly of the present invention is utilized in commercial delivery apparatus, the same may be, of course, made from other materials such as stainless steel, etc.

The present invention may be embodied in other specific forms without departing from the spirit or essential attributes thereof and, accordingly, reference should be made to the appended claims, rather than to the foregoing specification as indicating the scope of the invention.

We claim:

1. An automatic controlled volume liquid delivery assembly comprising a reservoir chamber, a graduated cylinder in said chamber, a plunger reciprocably disposed within said cylinder, said cylinder being in open communication with said chamber, means for regulating the excursion of said plunger, a conduit communicating with said chamber for delivering a controlled volume of liquid from said reservoir chamber, and selectively operable means for venting said reservoir chamber.

2. An automatic controlled volume liquid delivery assembly in accordance with claim 1 in which the plunger is vertically disposed and the means for regulating the excursion of said plunger includes a selectively adjustable stop above said plunger and a stop shoulder at the bottom of said cylinder, and with the bottom of said cylinder being partially cut away to facilitate the removal of air from within said cylinder and to form said stop shoulder.

3. An automatic controlled volume liquid delivery assembly comprising a reservoir chamber, a graduated cylinder in said reservoir chamber, said cylinder being in open communication with said chamber, a plunger reciprocally mounted within said graduated cylinder, and means for regulating the excursion of said plunger, a conduit for delivering a controlled volume of liquid from said reservoir chamber, selectively operable means for venting said reservoir chamber, means for charging liquid to said reservoir chamber in communication with said conduit, and valve means intermediate said reservoir chamber and said charging means selectively permitting either joining said reservoir chamber to said charging means or allowing the delivery of a controlled volume of liquid from said reservoir chamber.

4. An automatic controlled volume liquid delivery assembly comprising a reservoir chamber, said reservoir chamber including a plunger mounted within a graduated cylinder, and means for regulating the excursion of said plunger, a conduit for delivering a controlled volume of liquid from said reservoir chamber, means for charging liquid to said reservoir chamber in communication with said conduit, valve control means intermediate said reservoir chamber and said charging means selectively permitting either joining said reservoir chamber to said charging means or allowing the delivery of a controlled volume of liquid from said reservoir chamber, a Seligson pipette including a stopcock, a delivery connection in communication with said valve means joined to said stopcock, a suction take-off joined to said stopcock, with said suction take-off being in communication with evacuating means, and a discharge tip joined to said stopcock, with said stopcock selectively permitting either the coupling of said delivery connection to said discharge tip or the coupling of said suction take-off to said discharge tip and a connector joining said valve means to said stopcock whereby upon the coupling of said delivery connection to said discharge tip said reservoir chamber is joined to said delivery connection by said valve means and upon the coupling of said suction take-off to said discharge tip said reservoir chamber is joined to said charging means by said valve means.

5. An automatic controlled volume liquid delivery assembly in accordance with claim 4 in which one pump both charges the liquid to said reservoir chamber and shares as the evacuation means in communication with said suction take-off.

6. An automatic controlled volume liquid delivery assembly in accordance with claim 4 in which the reservoir chamber includes means for venting it.

7. An automatic controlled volume liquid delivery assembly in accordance with claim 4 in which the plunger within the reservoir chamber is vertically disposed and the means for regulating the excursion of said plunger includes a selectively adjustable stop above said plunger and a stop shoulder at the bottom of the cylinder in the reservoir chamber, and with the bottom of the cylinder in the reservoir chamber being cut away to facilitate the removal of air from within the cylinder and to form the stop shoulder.

8. An automatic controlled volume liquid delivery assembly comprising a chamber, a plunger reciprocably mounted within said chamber, means for regulating the excursion of said plunger, a conduit for delivering a controlled volume of liquid from said chamber, means for charging liquid to said chamber in communication with said conduit, first valve means intermediate said chamber and said charging means selectively permitting either joining said chamber to said charging means or allowing the delivery of a controlled volume of liquid from said chamber into a delivery conduit, suction take-off means, a discharge tip, and second valve means intermediate said discharge tip and delivery conduit and discharge tip and suction take-off means for selectively permitting either joining said discharge tip to said suction take-off means or allowing the delivery of a controlled volume of liquid from said delivery conduit to said discharge tip.

9. An assembly in accordance with claim 8 including a means coupling an actuator for each valve means whereby said first and second valve means are operable in unison.

References Cited in the file of this patent

UNITED STATES PATENTS

| | | |
|---|---|---|
| 816,305 | Dunn | Mar. 27, 1906 |
| 1,979,428 | Wheeler | Nov. 6, 1934 |
| 2,373,435 | Torigian | Apr. 10, 1945 |
| 3,012,863 | Feichtmeir | Dec. 12, 1961 |

FOREIGN PATENTS

| | | |
|---|---|---|
| 23,196 | Great Britain | Oct. 19, 1896 |